US012707040B2

(12) United States Patent
Tsai et al.

(10) Patent No.: US 12,707,040 B2
(45) Date of Patent: Aug. 11, 2026

(54) PREDICTION REFINEMENT WITH CONVOLUTION MODEL

(71) Applicant: MEDIATEK INC., Hsinchu City (TW)

(72) Inventors: Chia-Ming Tsai, Hsinchu City (TW); Man-Shu Chiang, Hsinchu City (TW); Chih-Wei Hsu, Hsinchu City (TW); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 79 days.

(21) Appl. No.: 18/864,731

(22) PCT Filed: May 11, 2023

(86) PCT No.: PCT/CN2023/093546
§ 371 (c)(1),
(2) Date: Nov. 11, 2024

(87) PCT Pub. No.: WO2023/217235
PCT Pub. Date: Nov. 16, 2023

(65) Prior Publication Data

US 2025/0310513 A1 Oct. 2, 2025

Related U.S. Application Data

(60) Provisional application No. 63/340,978, filed on May 12, 2022.

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/176* (2014.11); *H04N 19/196* (2014.11); *H04N 19/521* (2014.11)

(58) Field of Classification Search
CPC ..................................................... H04N 19/00
See application file for complete search history.

(56) References Cited

U.S. PATENT DOCUMENTS 11,039,145 B2 6/2021 Lu
11,924,461 B2 3/2024 Xu
(Continued)

FOREIGN PATENT DOCUMENTS

CN 108810552 A 11/2018
CN 111083491 A 4/2020
(Continued)

OTHER PUBLICATIONS

International Search Report and Written Opinion dated Aug. 9, 2023, issued in application No. PCT/CN2023/093546.
(Continued)

*Primary Examiner* — Maryam A Nasri
(74) *Attorney, Agent, or Firm* — McClure, Qualey & Rodack, LLP

(57) ABSTRACT

A method for deriving and using a cross component model to refine intra- or inter-prediction when encoding or decoding a block of pixels is provided. A video coder receives data for the block of pixels to be encoded or decoded as a current block of a current picture of a video. The video coder generates an initial predictor for the current block based on a reference block. The video coder receives a first set of component samples of pixels within or neighboring the reference block. The video coder receives a second set of component samples of pixels within or neighboring the current block. The video coder derives a model based on the first and second sets of component samples. The video coder applies the derived model to the initial predictor to generate a refined predictor. The video coder decodes or encodes the current block by using the refined predictor.

17 Claims, 11 Drawing Sheets

(51) Int. Cl.

| | |
|---|---|
| ***H04N 19/176*** | (2014.01) |
| ***H04N 19/196*** | (2014.01) |
| ***H04N 19/513*** | (2014.01) |

(56) References Cited

U.S. PATENT DOCUMENTS

| | | | | |
|---|---|---|---|---|
| 12,041,267 | B2 | 7/2024 | Liu | |
| 12,108,072 | B2 | 10/2024 | Liu | |
| 2020/0059650 | A1* | 2/2020 | Lu | H04N 19/117 |
| 2021/0227250 | A1* | 7/2021 | Liu | H04N 19/513 |
| 2022/0150507 | A1* | 5/2022 | Lin | H04N 19/577 |

FOREIGN PATENT DOCUMENTS

| | | | |
|---|---|---|---|
| CN | 111903131 | A | 11/2020 |
| CN | 113366851 | A | 9/2021 |
| WO | 2019194497 | A1 | 10/2019 |
| WO | 2020182216 | A1 | 9/2020 |

OTHER PUBLICATIONS

Chang, Y., et al.; “Compression efficiency methods beyond VVC;” Joint Video Experts Team (JVET) of ITU-T SG 16 WP 3 and ISO/IEC JTC 1/SC 29; Jan. 2021; pp. 1-13.

* cited by examiner

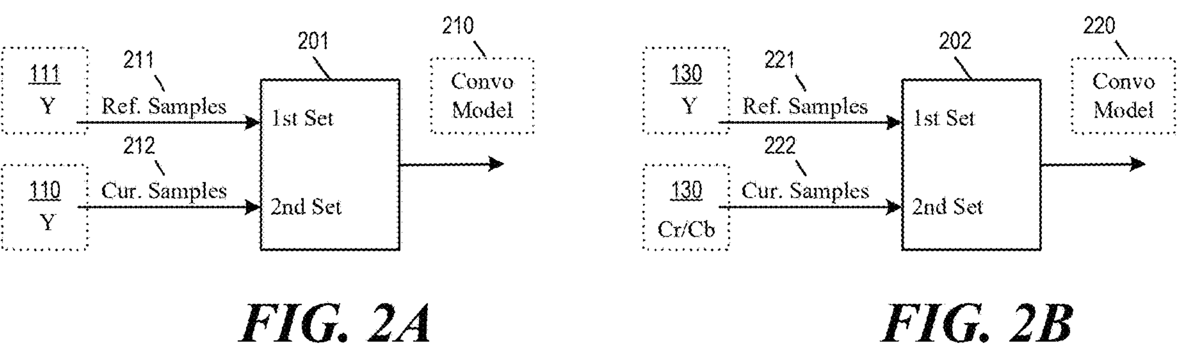
FIG. 2A
FIG. 2B
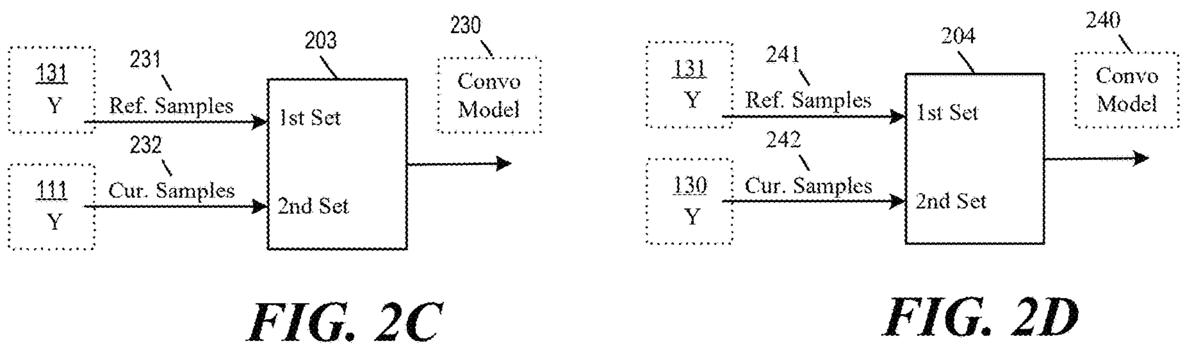
FIG. 2C
FIG. 2D
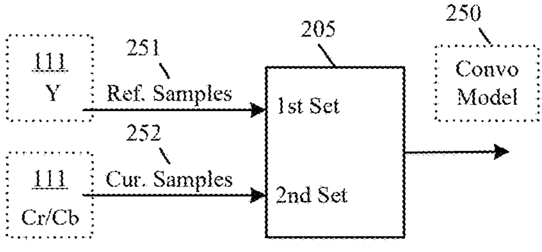
FIG. 2E

PREDICTION REFINEMENT WITH CONVOLUTION MODEL

CROSS REFERENCE TO RELATED PATENT APPLICATION(S)

The present disclosure is part of a non-provisional application that claims the priority benefit of U.S. Provisional Patent Application No. 63/340,978, filed on 12 May 2022. Content of above-listed application is herein incorporated by reference.

TECHNICAL FIELD

The present disclosure relates generally to video coding. In particular, the present disclosure relates to methods of coding pixel blocks by inter-prediction refinement.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for deriving and using a cross component model to refine intra- or inter-prediction when encoding or decoding a block of pixels. A video coder receives data for the block of pixels to be encoded or decoded as a current block of a current picture of a video. The video coder generates an initial predictor for the current block based on a reference block. The video coder receives a first set of component samples of pixels within or neighboring the reference block. The reference block may be identified by a motion vector, a block vector, or an intra-prediction mode of the current block. The video coder receives a second set of component samples of pixels within or neighboring the current block. The video coder derives a model based on the first and second sets of component samples. The derived model may be linear or non-linear The derived model may be a convolution model that includes a M×N filter. The video coder applies the derived model to the initial predictor to generate a refined predictor. The video coder decodes or encodes the current block by using the refined predictor.

In some embodiments, the first set of component samples are neighboring samples of the reference block and the second set of component samples are neighboring samples of the current block. In some embodiments, the first set of component samples are luma samples of the reference block and the second set of component samples are luma samples of the current block. In some embodiments, the first set of component samples are chroma samples of the reference block and the second set of component samples are chroma samples of the current block.

In some embodiments, the video coder derives multiple candidate models based on the first and second sets of component samples and selects one candidate model from the multiple candidate models. In some embodiments, the video coder signals ore receives an indication (e.g., a syntax element) in a bitstream for selecting the candidate model from the multiple candidate models. In some embodiments, the candidate model is selected implicitly based on a setting (e.g., template-matching setting, boundary-matching setting, or model-accuracy setting) for coding the current block.

In some embodiments, the video coder signals or receives an indication in the bitstream for determining whether to use the initial predictor or the refined predictor to encode or decode the current block. In some embodiments, the video coder implicitly determines whether to use the initial predictor or the refined predictor to encode or decode the current block based on a setting (e.g., template-matching setting, boundary-matching setting, or model-accuracy setting) for coding the current block.

In some embodiments, a weighted sum of the refined predictor and the initial predictor is used as a final predictor for reconstructing the current block. In some embodiments, a first weight assigned to the initial predictor and a second weight assigned to the refined predictor for generating the weighted sum are determined based on one or more prediction modes used to code one or more neighboring blocks of the current block. In some embodiments, the first weight and the second weight are determined based on a first number of neighboring blocks coded in a first prediction mode and a second number of neighboring blocks coded in a second prediction mode. (First and second prediction modes may be any of intra, inter, AMVP, merge mode, etc.)

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIGS. 2A-E conceptually illustrate deriving convolution models based on reference and current samples.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Refine Prediction by Convolution Model

To improve video compression efficiency, a video coder may use video coding tools or prediction modes that use predictors. An inter coding tool may utilize temporal information to predict the current block. An intra coding tool may reference spatial neighboring samples to predict the current block. A cross-component coding tool may use cross-component information to generate a cross-component prediction of the current block.

In some embodiments, for a current block that references a reference block as a predictor for inter-prediction or intra-prediction, two sets (first and second sets) of samples from the color components (e.g., YCbCr or RGB) of the current and reference blocks are used to derive a convolution model. The convolution model is used to refine the inter-prediction or intra-prediction of the current block. The first set of samples are in or neighboring the reference block (also referred to as reference samples). The second set of samples are in or neighboring the current block (also referred to as current samples). The convolution model can be derived by using the first set of samples and the second set of samples. The convolution model can be used to generate a cross-component prediction based on a first (set of) color component(s) for a second (set of) color component(s).

Figure 1A:
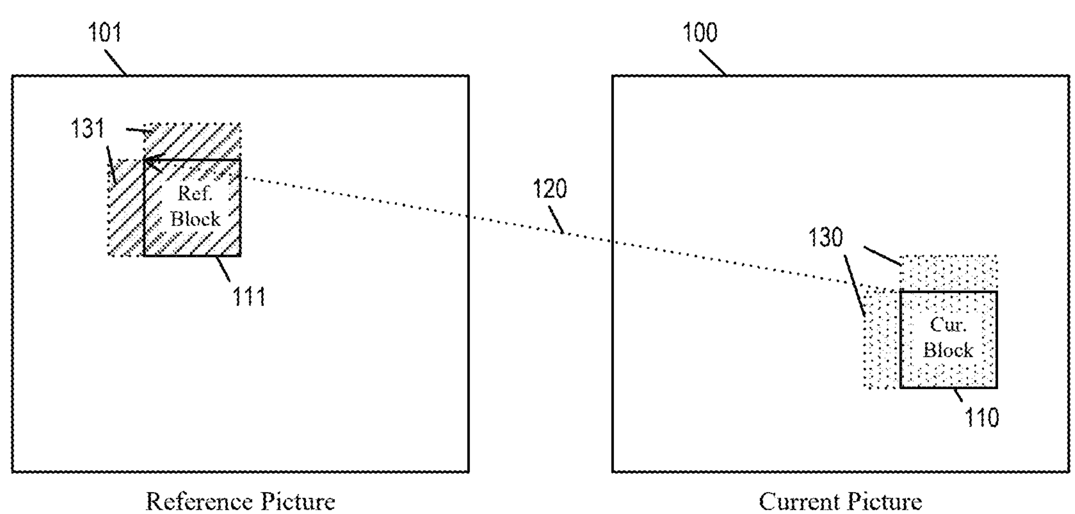
FIGS. 1A-B conceptually illustrate a current block and its reference block.
Figure 1B:
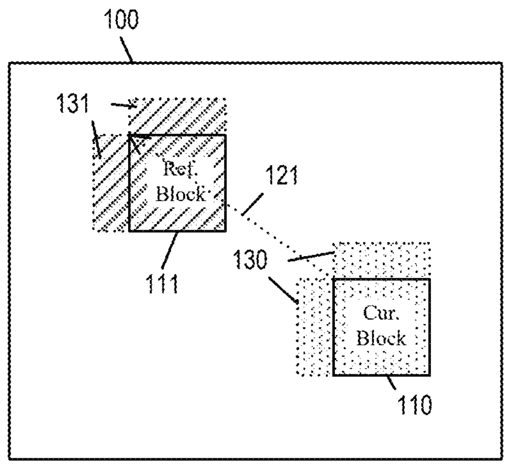

FIGS. 1A-B conceptually illustrate a current block and its reference block. The current block 110 is in a current picture 100. The reference block 111 is a predictor for the current block 110 according to inter-prediction or intra-prediction.

FIG. 1A illustrates the reference block 111 being a predictor of the current block 110 under inter-prediction. As illustrated, a motion vector (MV) 120 of the current block 110 identifies the reference block 111 in a reference picture 101 as a predictor of the current block for inter-prediction.

FIG. 1B illustrates the reference block 111 being a predictor of the current block 110 under intra-prediction. As illustrated, an intra-prediction direction or mode 121 or a block vector (BV) identifies or derives the reference block 111 from samples of the current picture 100 as a predictor of the current block 110 for intra prediction.

As illustrated in FIGS. 1A-B, a current template region 130 includes reconstructed samples that neighbors the current block 110 in the current picture 100. The current template region 130 has a corresponding or collocated reference template region 131 neighboring the reference block 111 in either the current picture 100 (for intra-prediction) or the reference picture 101 (for inter-prediction). The current samples may be taken from within or around the current block 110 and the current template region 130. The reference samples may be taken from within or around a reference block 111 and the reference template region 131. In some embodiments, reference samples and current samples are used to derive a convolution model.

The convolution model may be a cross-component model. For example, in some embodiments, the convolution model may be constructed using reference and current samples of a first color component in collocated regions (e.g., between Y samples in the reference template 131 and Y samples in current template 130) and be used to predict samples of a second color component in collocated regions (e.g., from Cr or Cb of reference block 111 to refined prediction of Cr or Cb for current block 110). For another example, in some embodiments, the convolution/cross-component model may be constructed using corresponding cross-component reference and/or current samples of first and second color components of a first region (e.g., Y vs. Cr/Cb in the reference block 111 or current template 130) and be used to make cross-component prediction in a second region (e.g., from Y to Cr/Cb in the current block 110).

The convolution model may also be used in a non-cross-component manner. For example, a convolution model derived based on reference and current samples of a first color component in and around a first block (e.g., between Y samples in the reference template 131 and Y samples of the reference block 111) can be used to predict samples of the same first color component in a second block (e.g., from Y samples in the current template 130 to Y samples in the current block 110). Nevertheless, in the following sections, the term “cross-component model” is used interchangeably with the term “convolution model”.

FIGS. 2A-E conceptually illustrate deriving convolution models based on reference and current samples. FIG. 2A shows a derivation process 201 using reference samples 211 and current samples 212 to derive a convolution model 210. The reference samples 211 are Y samples in the reference block 111 and current samples 212 are Y samples in the current block 110. FIG. 2B shows a derivation process 202 using reference samples 221 and current samples 222 to derive a convolution model 220. The reference samples 221 are Y samples in the reference block 111 (or the current template 130), and the current samples 222 are Cr/Cb samples in the reference block 111 (or the current template 130.) FIG. 2C shows a derivation process 203 using reference samples 231 and current samples 232 to derive a convolution model 230. The reference samples 231 are Y samples in the reference template 131, and the current sample 232 are Y samples in the reference block 111. FIG. 2D shows a derivation process 204 using reference samples 241 and current samples 242 to derive a convolution model 240. The reference samples 241 are Y samples in the reference template 131, and the current sample 242 are Y samples in the current template 130. FIG. 2E shows a derivation process 205 using reference samples 251 and current samples 252 to derive a convolution model 250. The reference samples 251 are Y samples in the reference block 111, and the current sample 252 are Cr/Cb samples in the reference block 111. The derivation of cross-component/convolution model will be further described in Section B below.

Figure 3A:
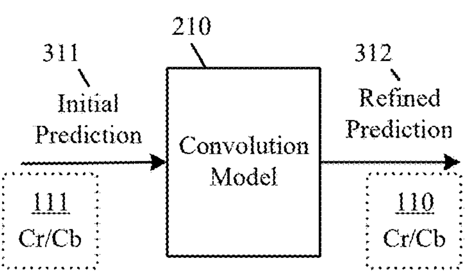
FIGS. 3A-E illustrate applying derived convolution models to refine initial predictions into refined predictions.
Figure 3B:
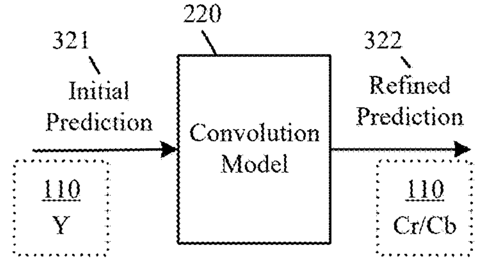
Figure 3C:
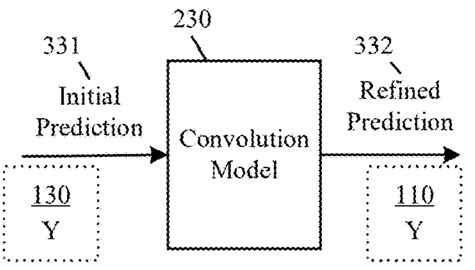
Figure 3D:
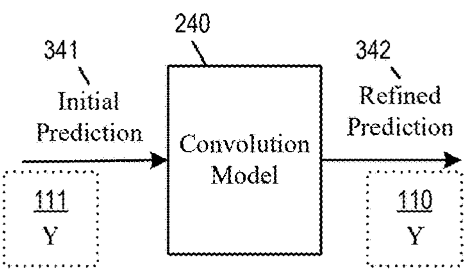
Figure 3E:
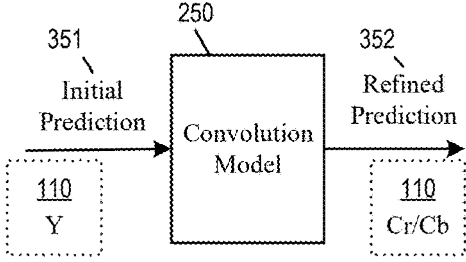

FIGS. 3A-E illustrate applying derived convolution models to refine initial predictions into refined predictions. FIG. 3A shows using the convolution model 210 to refine an initial prediction 311 into a refined prediction 312. The initial prediction 311 is Cr or Cb of the reference block 111 and the refined prediction 312 is for reconstructing Cr or Cb of the current block 110. FIG. 3B shows using the convolution model 220 to refine an initial prediction 321 into a refined prediction 322. The initial prediction 321 is reconstructed Y samples of the current block 110 and the refined prediction 322 is for reconstructing Cr/Cb in the current block 110. FIG. 3C shows using the convolution model 230 to refine an initial prediction 331 into a refined prediction 332. The initial prediction 331 are reconstructed Y samples in the current template 130 and the refined prediction 332 are for reconstructing Y samples in the current block 110. FIG. 3D shows using the convolution model 240 to refine an initial prediction 341 into a refined prediction 342. The initial prediction 341 is Y samples in the reference block 111 and the refined prediction 342 is for reconstructing Y samples in the current block 110. FIG. 3E shows using the convolution model 250 to refine an initial prediction 351 into a refined prediction 352. The initial prediction 351 is Y samples in the current block 110 and the refined prediction 352 is for reconstructing Cr/Cb samples in the current block 110. The refinement of predictors by using cross-component/convolution model will be further described in Sections A-C below.

A. Selection of Input to Convolution Model

In some embodiments, the different color components of the reference samples taken within or around the reference block 111 (including the reference template 131) and of the current samples taken within or around the current block 110 (including the current template 130) may be respectively used as the first set and second set of samples to derive the cross-component model.

For example, the first set is Y (luma) component of the reference block 111, and the second set is the Y component of the current block 110; or, the first set is the Cb of the reference block 111, and the second set is the Cb of the current block 110; or, the first set is the Cr of the reference block 111, and the second set is the Cr of the current block 110.

In some embodiments, the samples in the first set are the neighboring samples (in reference template region 121) of the reference block 111, and the samples in the second set are the neighboring samples (in current template region 120) of the current block 110. In some embodiments, the samples in the first set are the samples in the reference block 111, and the samples in the second set are the samples in the current block 110.

In some embodiments, the samples in the first set or second set can be the integer or fractional position samples. For example, the integer position samples in the first set or second set can be the 1-precision, 2-precision, 4-precision, or 8-precision position samples; or, the fractional position samples in the first set or second set can be the ½-precision, ¼-precision, ⅛-precision, or 1/16-precision position samples.

In some embodiments, the samples in the first set or second set can be the reconstructed or original samples. In some embodiments, the samples in the first set or second set can be in a "reshape domain". In some embodiments, the samples in the first set or the second set are the neighboring samples of the reference block or the current block after applying a gradient filter (e.g., [−1, 0, 1; −2, 0, 2; −1, 0, 1], [1, 2, 1; 0, 0, 0; −1, −2, −1], [0, 1, 2; −1, 0, 1; −2, −1, 0], [0, −1, −2; 1, 0, −1; 2, 1, 0], or [0, −1, 0; −1, 4, −1; 0, −1, 0]). In some embodiments, the gradient filters applied to the first set of samples and the second set of samples are the same.

In some embodiments, the above-mentioned features can be combined to form the samples in the first set and the second set. For example, the first set samples may be the neighboring reconstructed integer Y samples of the reference block 111 (e.g., reference template region 121), and the second set samples may be the neighboring reconstructed integer Y samples of the current block 110 (e.g., current template region 120). For another example, the first set samples are the reconstructed integer Y samples in the reference block 111, and the second set samples are the original integer Y samples of the current block 110.

B. Deriving the Cross-Component Model

Figure 4:
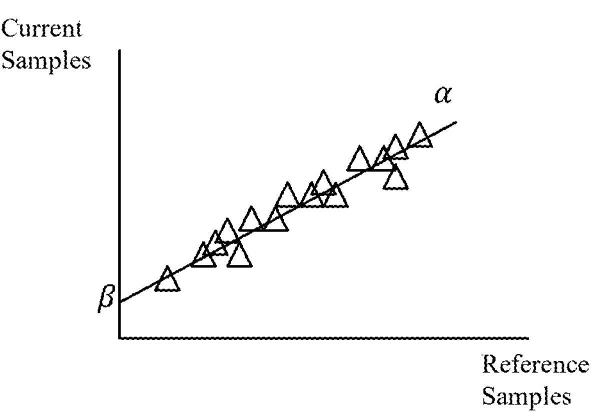
FIG. 4 conceptually illustrates using data pairs of corresponding reference and current samples to derive a linear model for cross-component prediction.

As mentioned, the samples in the first set and the second set are respectively used as reference samples and current samples to derive a linear or non-linear convolution model for cross-component prediction. In some embodiments, the convolution model is a linear model, and the model parameters to be derived include scale (denoted as alpha or a) and offset (denoted as beta or b) parameters. FIG. 4 conceptually illustrates using data pairs of corresponding reference and current samples to derive a linear model for cross-component prediction.

Figure 5:
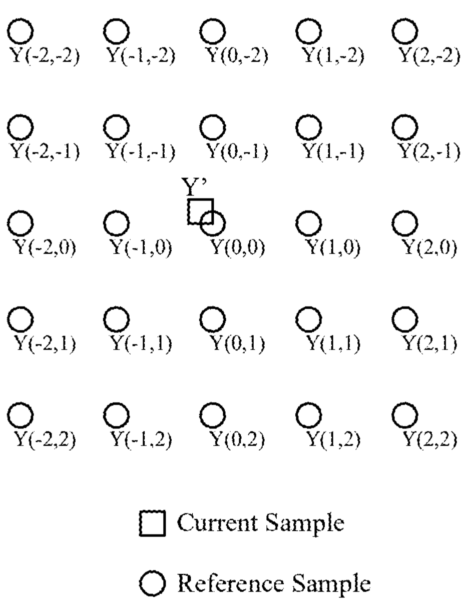
FIG. 5 illustrates corresponding reference samples and current samples that are used to derive a M×N filter for defining a cross-component linear model.

In some embodiments, a M×N filter shape is used to define the model parameters of the convolution/cross-component model. FIG. 5 illustrates corresponding reference samples and current samples that are used to derive a M×N filter for defining a cross-component linear model. In the figure, the reference samples (the first set) are denoted as $Y_{(i,j)}$ and the current sample (the second set) is denoted as Y'. The position of $Y_{(i,j)}$ can be at integer or fractional position. The neighboring samples of the reference block 111 (collocated with the neighboring sample of the current block 110) corresponds to $Y_{(i,j)}$, where i=0, ±1, ±2, . . . , and j=0, ±1, ±2, . . . , and the phase of the Y' is mapped to $Y_{(0,0)}$.

For a 1×2 filter (i.e., M=1, N=2), the cross-component model is $Y'=a_{(0,0)}\times Y_{(0,0)}+a_{(0,1)}\times Y_{(0,1)}+b$, where $a_{(0,0)}$ and $a_{(0,1)}$ are scale parameters, and b is the offset. In case of a 2×2 filter (i.e., M=2, N=2), the cross-component model is $$Y' = \sum_{m=0}^{1}\sum_{n=0}^{1}(a_{(m,n)} \times Y_{(m,n)}) + b,$$

where $\alpha_{(m,n)}$ are scale parameters, and b is the offset. In case of a 3×2 filter (i.e., M=3, N=2), the cross-component model is $$Y' = \sum_{m=-1}^{1}\sum_{n=0}^{1}(a_{(m,n)} \times Y_{(m,n)}) + b,$$

where $\alpha_{(m,n)}$ are scale parameters, and b is the offset. The model parameters (i.e., $\alpha_{(m,n)}$ and b) may have values that are positive, negative, or zero.

For some embodiments, the generic model for the linear model that uses a M×N filter shape is formulated as $$Y' = \sum_{m=-\lceil M/2\rceil}^{\lfloor M/2\rfloor}\sum_{n=-\lceil N/2\rceil}^{\lfloor N/2\rfloor}(a_{(m,n)} \times Y_{(m,n)}) + b,$$

where $Y_{(m,n)}$ are neighboring samples of the reference block, $\alpha_{(m,n)}$ are scale parameters, and b is the offset. Model parameters (i.e., $\alpha_{(m,n)}$ and b) could be a positive or negative value or 0. If a neighboring sample of the reference block is unavailable, it could use other sample or default sample value to replace the unavailable sample.

In some embodiments, a non-linear term can be integrated into the convolution model (thereby making the model into a non-linear model). For example, clipping, constant based on bit-depth to represent a sample value, or Min/Max operations can be integrated into the convolution model.

In some embodiments, a higher degree model is used to predict chroma samples, instead of the linear model. For example, $Y_{(m,n)}{}^{x}$, where x>1. For another example, the exponential term of the mean of the neighboring samples of $Y_{(0,0)}$.

In some embodiments, the model parameters are derived at the encoder side and signaled to the decoder side for relieving the decoder of complexity or coding dependency. For example, the scale or offset parameters or its correction term may be explicitly signaled in the bitstream.

In some embodiments, more than one model parameters may be signaled to the decoder side, but only a subset of the model parameters are signaled, and the remaining model parameters are implicitly derived (by neighboring samples or signaled correction terms). For example, if two model parameters are used for the current block, only one model parameter is signaled, and the other model parameter is implicitly derived by neighboring samples. For still another example, if M×N model parameters are used for the current block, k out of M×N model parameters are signaled (M×N>k≥1), and other model parameters are implicitly derived by neighboring samples. For another example, the video encoder can signal a correction term to refine an implicitly derived parameter, and the other parameters are further refined according to the corrected parameter.

C. Applying the Derived Model to Refine the Prediction Samples

The derived model parameters are used to refine the prediction samples of the current block. In the following, the predictor (e.g., inter-prediction or intra-prediction) of the current block is denoted as P. The refined predictor, denoted as P', is obtained by applying the derived cross-component/convolution model to the initial or unrefined predictor P.

In some embodiments, if the linear model uses a 1×2 filter shape, the refined prediction at position (i,j) inside the current block is formulated as $P'_{(i,j)}=a_{(0,0)}\times P_{(i,j)}+a_{(0,1)}\times P_{(i,j+1)}+b$, where $P_{(i,j)}$ and $P_{(i,j+1)}$ are the unrefined prediction sample, $a_{(0,0)}$, $a_{(0,1)}$, and b are model parameters which are explicitly signaled or implicitly derived by neighboring samples of the reference block and the current block.

In some embodiments, if the convolution/cross-component model uses a 3×2 filter shape, the refined prediction at position (i,j) inside the current block is formulated as $$P'_{(i,j)} = \sum_{m=-1}^{1}\sum_{n=0}^{1}(a_{(m,n)} \times P_{(i+m,j+n)}) + b,$$

where $P_{(i+m,j+n)}$ is the unrefined prediction sample, $\alpha_{(m,n)}$ and b are model parameters which are explicitly signaled or implicitly derived by neighboring samples of the reference block and the current block.

In some embodiments, if the convolution/cross-component model uses a M×N filter shape, the refined prediction at position (i,j) inside the current block is formulated as $$P'_{(i,j)} = \sum_{m=-\lceil M/2 \rceil}^{\lfloor M/2 \rfloor} \sum_{n=-\lceil N/2 \rceil}^{\lfloor N/2 \rfloor} (a_{(m,n)} \times P_{(i+m,j+n)}) + b,$$

where $P_{(i+m,j+n)}$ is the unrefined prediction sample, $\alpha_{(m,n)}$ and b are model parameters which are explicitly signaled or implicitly derived by neighboring samples of the reference block and the current block. In some embodiments, if an unrefined prediction sample is unavailable, the video coder may use other sample or default sample value to replace the unavailable sample.

In some embodiments, the samples in P are integer position samples. In some embodiments, if the prediction samples of the current block are at fractional precision positions, the samples at the nearest integer positions of the fractional precision positions are used for P.

In some embodiments, if a gradient filter (e.g., [−1, 0, 1; −2, 0, 2; −1, 0, 1], [1, 2, 1; 0, 0, 0; −1, −2, −1], [0, 1, 2; −1, 0, 1; −2, −1, 0], [0, −1, −2; 1, 0, −1; 2, 1, 0], or [0, −1, 0; −1, 4, −1; 0, −1, 0]) is applied to the samples in the first set or second set, the video coder may apply the same gradient filter to the prediction samples of the current block before applying model parameters. Note, if a (unrefined) prediction sample is unavailable, the video coder may use other sample or default sample value to replace the unavailable sample.

In some embodiments, the predictors of P and P' are blended as the final predictor of the current block and formulated as:

$$P_{final}(i, j) = \left(w1 \times P_{(i,j)} + w2 \times P'_{(i,j)} + c\right) >> d$$

where w1 and w2 are weighting parameters. In some embodiments, w1 and w2 are set depends on the position (i,j). Each position may have different w1 and w2. In some embodiments, w1 and w2 are uniform for the current block. In some embodiments, w1 and w2 are determined based on the neighboring blocks. In some embodiments, when the number of neighboring blocks coded in a first prediction mode is more than a threshold, or more than the number of neighboring blocks coded in a second, different prediction mode, w2 is larger than w1. The neighbor blocks may refer to the top and left neighbors, or any 4×4 blocks around the left side and top side of the current block. The first prediction mode and the second prediction mode may be the mode with the proposed prediction refinement method, intra, inter, AMVP, or merge mode, albeit the first and second prediction modes shall be different.

In some embodiments, based on the different settings of filter shape or different groupings of neighboring samples, more than one candidate models may be used to refine the current predictor.

In some embodiments, an explicit rule is used to decide whether to enable or disable the cross-component coding tool and/or the explicit rule is used to decide a candidate model when the cross-component coding tool is enabled. For example, a flag may be signaled/parsed at the block level to determine whether the cross-component coding tool is applied to the current block (e.g., if the flag is true then enable the tool for the current block; if the flag is false then disable the tool for the current block). If more than one candidate models are available for the current block, then another syntax may be signaled to indicate which candidate model is selected to be applied.

In some embodiments, an implicit rule is used to determine whether to enable or disable the cross-component coding tool and/or the implicit rule is used to decide a candidate mode when the cross-component coding tool is enabled. The implicit rule may depend on template-matching setting, boundary-matching setting, or model-accuracy setting. Template-matching setting is described in Section D below. Boundary-matching setting is described in Section E below. Model-accuracy setting is described in Section F below.

In some embodiments, the implicit rule for intra and inter coded blocks can be unified. For example, when template-setting is used as the implicit rule, the derivation process for the template setting for an inter block is unified with the process for an intra block (e.g., an TIMID block).

In some embodiments, the threshold used in template matching and/or boundary matching and/or model accuracy may depend on the block size, sequence resolution, neighboring blocks, and/or QP. In some embodiments, the signaled or implicit derived MVs of the current block with the proposed method are in the integer precision. In some embodiments, if the signaled or implicitly derived MVs of the current block with the proposed method are rounded/clipped to the integer precision, then the predictor (P) of the current block is from the integer precision MVs.

D. Template-Matching

When template matching setting is used, the model parameters for each candidate mode are derived based on the reference samples of templates of the reference block and the current block and then performed the derived model parameters on the template (neighboring region) of the current block.

Step 1: Take the reconstructed samples on the template of current block as the golden data.

Step 2: For each candidate mode, apply the derived model parameters to the template of corresponding luma block to get the predicted samples within the template of the current chroma block.

Step 3: For each candidate mode, calculate the distortion between the golden data and the predicted samples on the template.

Step 4: Decide the mode for the current block according to the calculated distortions. In some embodiments, the candidate mode with the smallest distortion is used for the current block.

In some embodiment, regarding to the enabling condition of the coding tool, the coding tool can be applied to the current block when the minimum distortion is smaller than a pre-defined threshold. For example, the pre-defined threshold can be T*template area, where T can be any floating value or 1/N. (N can be any positive integer), and the template area is set as template width*the current block height+template height*the current block width.

For another example, the pre-defined threshold is the distortion between the reconstructed samples of the template for the current block and the predicted samples of the template generated from the default mode (original mode, not refined by the cross-component model). When the cross-component prediction is used to refine the inter prediction, the default mode is the original inter mode which can be a regular, merge candidate, AMVP candidate, an affine candidate, an GPM candidate, or any one of merge candidate. In some embodiments, the template size can be adjusted. The adjustment of the template size will be described along with the boundary-matching setting.

E. Boundary-Matching Setting

For some embodiments, when boundary-matching setting is used, a boundary matching cost for a candidate mode refers to the discontinuity measurement (including top boundary matching and/or left boundary matching) between the current prediction (the predicted samples within the current block), generated from the candidate mode, and the neighboring reconstruction (the reconstructed samples within one or more neighboring blocks). Top boundary matching means the comparison between the current top predicted samples and the neighboring top reconstructed samples, and left boundary matching means the comparison between the current left predicted samples and the neighboring left reconstructed samples. In some embodiments, the candidate mode with the smallest boundary matching cost is applied to the current block.

In some embodiments, regarding to the enabling condition of the coding tool (predictor refinement by cross-component model), the coding tool can be applied to the current block when the minimum boundary matching cost is smaller than a pre-defined threshold. For example, the pre-defined threshold is the boundary matching cost from the default mode (original mode, not refined with the proposed coding tool). When the cross-component prediction is used to refine the inter prediction, the default mode is the original inter mode which can be a regular, merge candidate, AMVP candidate, an affine candidate, an GPM candidate, or any one of merge candidate.

In some embodiments, a pre-defined subset of the current prediction is used to calculate the boundary matching cost, for example, by using n line(s) of top boundary within the current block and/or m line(s) of left boundary within the current block. (Moreover, n2 line(s) of top neighboring reconstruction and/or m2 line(s) of left neighboring reconstruction are used.)

The following examples for n and m can also be applied to n2 and m2. For example, n can be any positive integer such as 1, 2, 3, 4, etc. For another example, m can be any positive integer such as 1, 2, 3, 4, etc. A possible way is that, n and/or m vary with block width, height, or area. For example, for a larger block (area>threshold2), m gets larger. Threshold2=64, 128, or 256. When area>threshold2, m is increased to 2. (Originally, m is 1.) When area>threshold2, m is increased to 4. (Originally, m is 1 or 2.) Another possible way is that, for a taller block (height>thrershold2*width), m gets larger and/or n gets smaller. Threshold2=1, 2, or 4. When height>thrershold2*width, m is increased to 2. (Originally, m is 1.) When height>thrershold2*width, m is increased to 4. (Originally, m is 1 or 2.) Another possible way is that, for a larger block (area>threshold2), n gets larger. Threshold2=64, 128, or 256. When area>threshold2, n is increased to 2. (Originally, n is 1.) When area>threshold2, n is increased to 4. (Originally, n is 1 or 2.) Another possible way is that, for a wider block (width>thrershold2*height), n gets larger and/or m gets smaller. Threshold2=1, 2, or 4. When width>thrershold2*height, n is increased to 2. (Originally, n is 1.) When width>thrershold2*height, n is increased to 4. (Originally, n is 1 or 2.)

F. Model-Accuracy Setting

When template-matching setting is used, the model parameters for each candidate mode are derived based on the reference samples of template of the reference block and the current block and then performed the derived model parameters on the template (neighboring region) of the current block.

Step 1: Take the reconstructed samples on the template of current block as the golden data.

Step 2: For each candidate mode, apply the derived model parameters to the reconstructed/predicted samples within the template of corresponding reference block to get the predicted samples within the template of the current block.

Step 3: For each candidate mode, calculate the distortion between the golden data and the predicted samples on the template. In some embodiments, the template used in the distortion calculation is the template used for model parameter derivation. For example, a model could use both left and top templates to calculate distortion. For another example, a model could use left template to calculate distortion. For another example, a model could use above template to calculate distortion.

Step 4: Decide the mode for the current block according to the calculated distortions. In some embodiments, the candidate mode with the smallest distortion is used for the current block. In some embodiments, regarding to the enabling condition of the coding tool, the coding tool can be applied to the current block when the minimum distortion is smaller than a pre-defined threshold. For example, the pre-defined threshold is T * template area, T can be any floating value or 1/N (N can be any positive integer), and Template area is set as template width * the current block height+template height * the current block width.

For example, the pre-defined threshold is the distortion between the reconstructed samples of the template for the current block and the predicted samples of the template generated from the default mode. When the cross-component prediction is used to refine the inter prediction, the default mode is the original inter mode which can be a regular, merge candidate, AMVP candidate, an affine candidate, an GPM candidate, or any one of merge candidate.

Prediction refinement by cross-component model (or convolution model) can be enabled and/or disabled according to implicit rules (e.g. block width, height, or area) or according to explicit rules (e.g., syntax on block, tile, slice, picture, SPS, or PPS level). For example, reordering may be applied when the block area is smaller than a threshold. The term "block" in this document may refer to TU/TB, CU/CB, PU/PB, pre-defined region, CTU/CTB, etc.

Any combination of the proposed methods in this invention can be applied. Any of the foregoing proposed methods can be implemented in encoders and/or decoders. For example, any of the proposed methods can be implemented in an inter/intra/prediction module of an encoder, and/or an inter/intra/prediction module of a decoder. Alternatively, any of the proposed methods can be implemented as a circuit coupled to the inter/intra/prediction module of the encoder and/or the inter/intra/prediction module of the decoder, so as to provide the information needed by the inter/intra/prediction module.

II. Example Video Encoder

Figure 6:
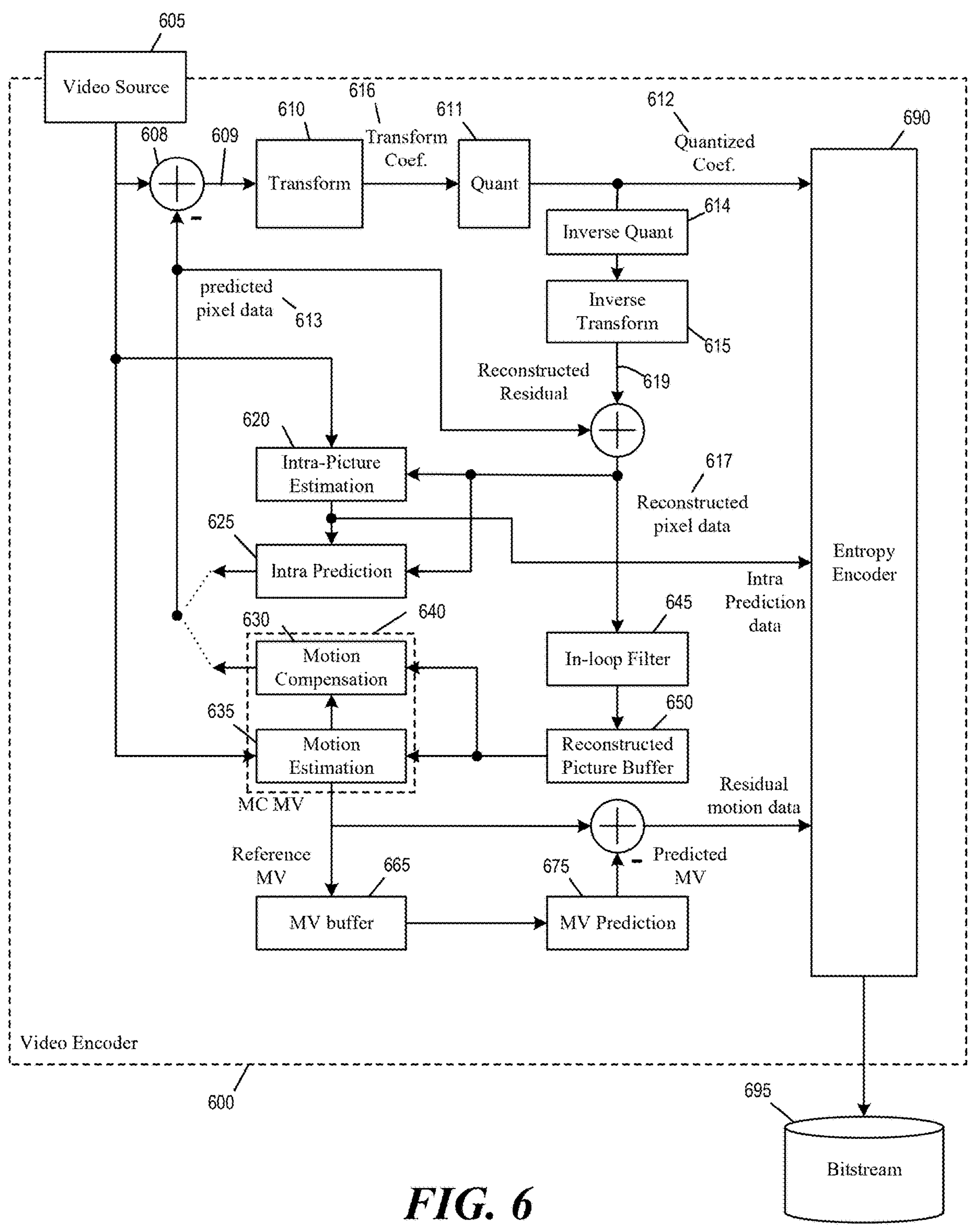
FIG. 6 illustrates an example video encoder that may use a cross component model to refine inter- or intra-predictions.

FIG. 6 illustrates an example video encoder 600 that may use a cross component model to refine inter- or intra-predictions. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625 as prediction residual 609. The transform module 610 converts the difference (or the residual pixel data or residual signal 608) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering or smoothing operations performed by the in-loop filter 645 include deblock filter (DBF), sample adaptive offset (SAO), and/or adaptive loop filter (ALF).

Figure 7:
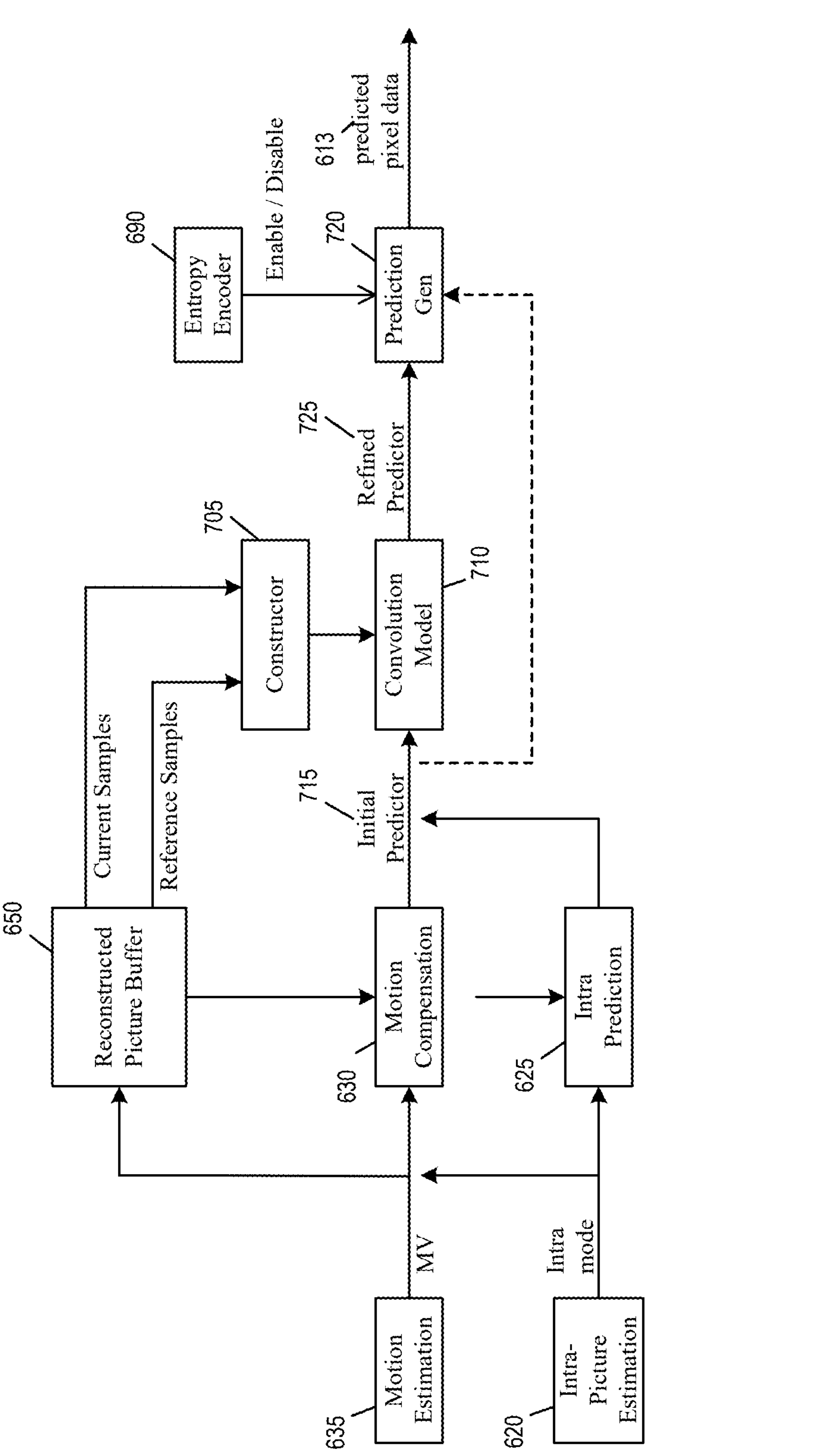
FIG. 7 illustrates portions of the video encoder that implement refinement of inter- or intra-predictions by cross-component model.

FIG. 7 illustrates portions of the video encoder 600 that implement refinement of inter- or intra-predictions by cross-component model. When the current block is coded by inter-prediction, the motion estimation module 635 provides a MV that is used by the motion compensation module 630 to identify a reference block in a reference picture. When the current block is coded by intra-prediction, the intra-prediction estimation module 620 provide an intra mode or BV that is used by the intra-prediction module 625 to identify a reference block in the current picture. In some embodiments, the reference block is used as an initial predictor of the current block.

To derive a cross-component (or convolution) model 710, a model constructor 705 retrieves component samples of pixels in and/or around the current block and in and/or around the reference block from the reconstructed picture buffer 650 to serve as reference samples (first set) and current samples (second set). The selection of reference samples and current samples are described in Section I-A above. The derivation of a cross-component model is described in Section I-B above.

The cross-component model 710 is applied to the initial predictor 715 (provided by either the motion compensation module 630 or the intra prediction module 625) to generate a refined predictor 725. The use of a cross-component model 710 to refine a predictor is described in Section I-C above. The samples of the refined predictor 725 may be used as the predicted pixel data 613. In some embodiments, the refinement of intra- or inter-prediction by cross-component model can be expressly or implicitly enabled or disabled (so that the samples of the initial predictor is used as the predicted pixel data 613), and the entropy encoder 690 may signal a syntax element to indicate so. In some embodiments, a prediction generator 720 combines (e.g., as a weighted sum) the initial predictor 715 and the refined predictor 725 as the predicted pixel data 613.

Figure 8:
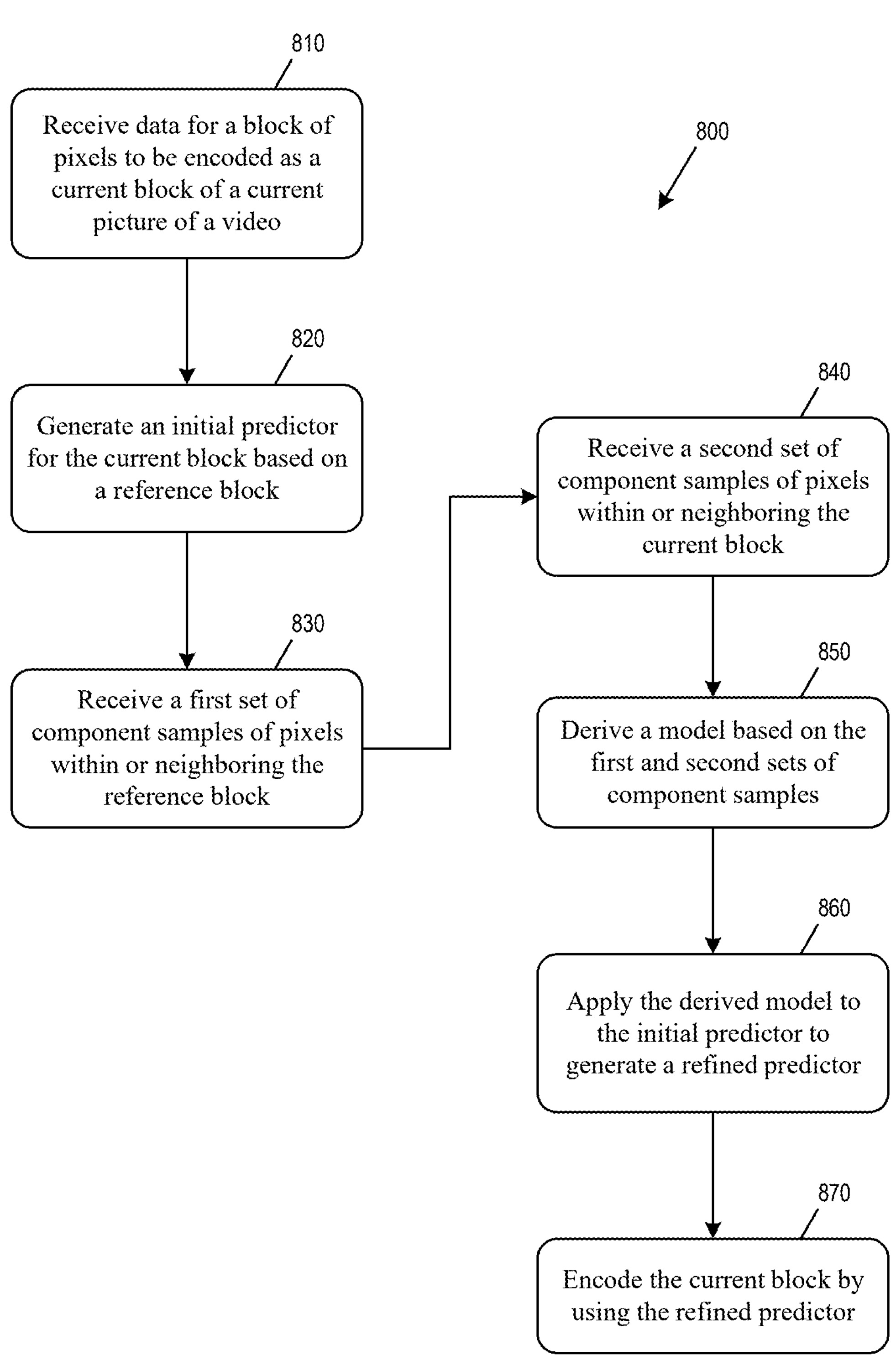
FIG. 8 conceptually illustrates a process that uses a predictor refined by a cross-component model when encoding a block of pixels.

FIG. 8 conceptually illustrates a process 800 that uses a predictor refined by a cross-component model when encoding a block of pixels. In some embodiments, one or more processing units (e.g., a processor) of a computing device implementing the encoder 600 performs the process 800 by executing instructions stored in a computer readable medium. In some embodiments, an electronic apparatus implementing the encoder 600 performs the process 800.

The encoder receives (at block 810) data to be encoded as a current block of pixels in a current picture of a video.

The encoder generates (at block 820) an initial predictor for the current block based on a reference block. The reference block may be identified by a motion vector, a block vector, or an intra-prediction mode of the current block.

The encoder receives (at block 830) a first set of component samples of pixels within or neighboring the reference block. The encoder receives (at block 840) a second set of component samples of pixels within or neighboring the current block. In some embodiments, the first set of component samples are neighboring samples of the reference block and the second set of component samples are neighboring samples of the current block. In some embodiments, the first set of component samples are luma samples of the reference block and the second set of component samples are luma samples of the current block. In some embodiments, the first set of component samples are chroma samples of the reference block and the second set of component samples are chroma samples of the current block.

The encoder derives (at block 850) a model based on the first and second sets of component samples. The derived model may be linear or non-linear (e.g., has a non-linear term such as clipping.) The derived model may be a convolution model that includes a M×N filter.

The encoder applies (at block 860) the derived model to the initial predictor to generate a refined predictor. In some embodiments, the encoder derives multiple candidate models based on the first and second sets of component samples and selects one candidate model from the multiple candidate models. In some embodiments, the encoder signals an indication (e.g., a syntax element) in a bitstream for selecting the candidate model from the multiple candidate models. In some embodiments, the candidate model is selected implicitly based on a setting (e.g., template-matching setting, boundary-matching setting, or model-accuracy setting) for encoding the current block.

The encoder encodes (at block 870) the current block by using the refined predictor to produce prediction residuals and to reconstruct the current block. In some embodiments, the encoder signals an indication to the bitstream for determining whether to use the initial predictor or the refined predictor to encode the current block. In some embodiments, the encoder implicitly determines whether to use the initial predictor or the refined predictor to encode the current block based on a setting (e.g., template-matching setting, boundary-matching setting, or model-accuracy setting) for encoding the current block.

In some embodiments, a weighted sum of the refined predictor and the initial predictor is used as a final predictor for reconstructing the current block. In some embodiments, a first weight assigned to the initial predictor and a second weight assigned to the refined predictor for generating the weighted sum are determined based on one or more prediction modes used to code one or more neighboring blocks of the current block. In some embodiments, the first weight and the second weight are determined based on a first number of neighboring blocks coded in a first prediction mode and a second number of neighboring blocks coded in a second prediction mode. (First and second prediction modes may be any of intra, inter, AMVP, merge mode, etc.)

III. Example Video Decoder

In some embodiments, an encoder may signal (or generate) one or more syntax element in a bitstream, such that a decoder may parse said one or more syntax element from the bitstream.

Figure 9:
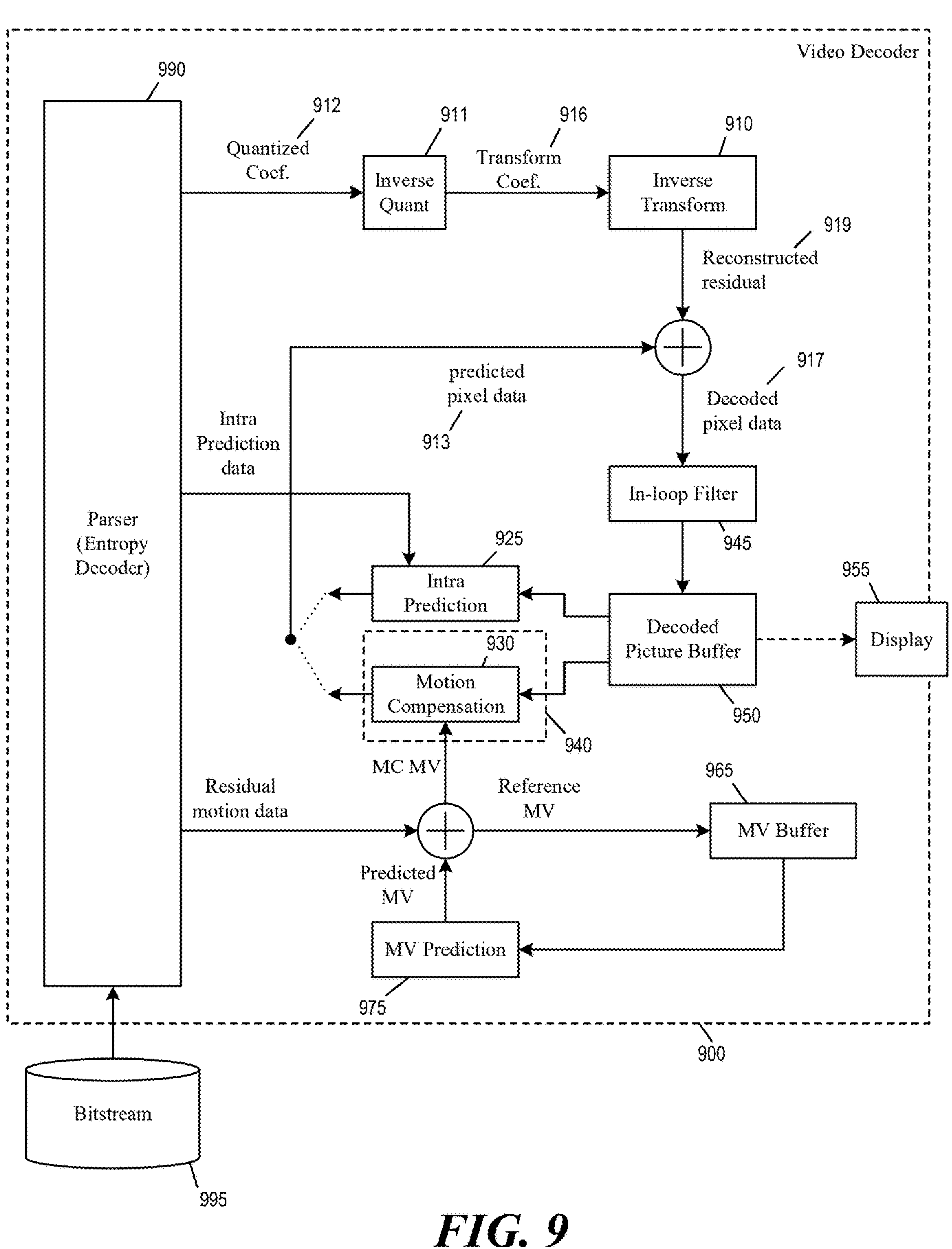
FIG. 9 illustrates an example video decoder that may use a cross component model to refine inter- or intra-predictions.

FIG. 9 illustrates an example video decoder 900 that may use a cross component model to refine inter- or intra-predictions. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 911, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 911 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering or smoothing operations performed by the in-loop filter 945 include deblock filter (DBF), sample adaptive offset (SAO), and/or adaptive loop filter (ALF).

Figure 10:
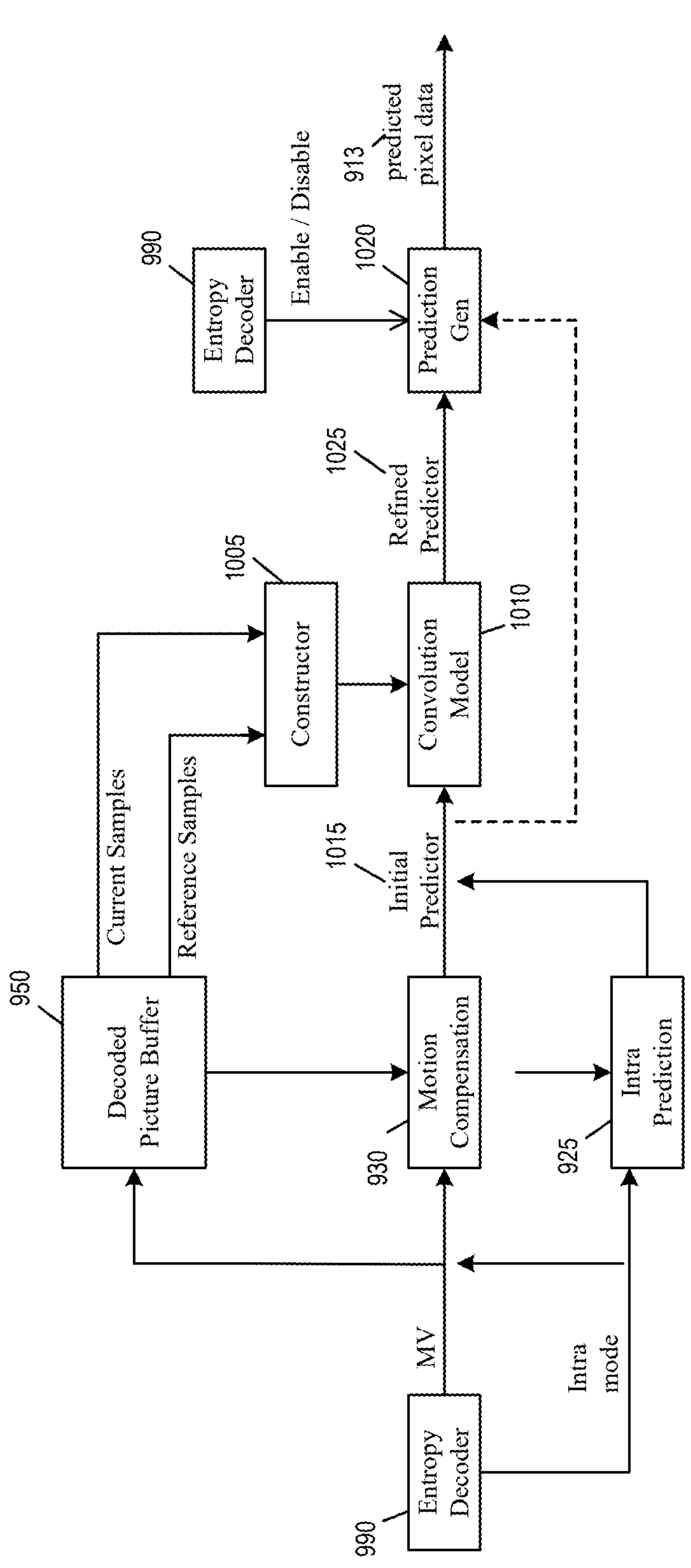
FIG. 10 illustrates portions of the video decoder that implement refinement of inter- or intra-predictions by cross-component model.

FIG. 10 illustrates portions of the video decoder 900 that implement refinement of inter- or intra-predictions by cross-component model. When the current block is coded by inter-prediction, the entropy decoder 990 provides a MV that is used by the motion compensation module 930 to identify a reference block in a reference picture. When the current block is coded by intra-prediction, the entropy decoder 990 provide an intra mode or BV that is used by the intra-prediction module 925 to identify a reference block in the current picture. In some embodiments, the reference block is used as an initial predictor 1015 of the current block.

To derive a cross-component (or convolution) model 1010, a model constructor 1005 retrieves component samples of pixels in and/or around the current block and in and/or around the reference block from the decoded picture buffer 950 to serve as reference samples (first set) and current samples (second set). The selection of reference samples and current samples are described in Section I-A above. The derivation of a cross-component model is described in Section I-B above.

The cross-component model 1010 is applied to the initial predictor 1015 (provided by either the motion compensation module 930 or the intra prediction module 925) to generate a refined predictor 1025. The use of a cross-component model 1010 to refine a predictor is described in Section I-C above. The samples of the refined predictor 1025 may be used as the predicted pixel data 913. In some embodiments, the refinement of intra- or inter-prediction by cross-component model can be expressly or implicitly enabled or disabled (so that samples of the initial predictor 715 is used as the predicted pixel data 913), and the entropy decoder 990 may receive a syntax element to indicate so. In some embodiments, a prediction generator 1020 may combine (e.g., as a weighted sum) the initial predictor 1015 and the refined predictor 1025 as the predicted pixel data 913.

Figure 11:
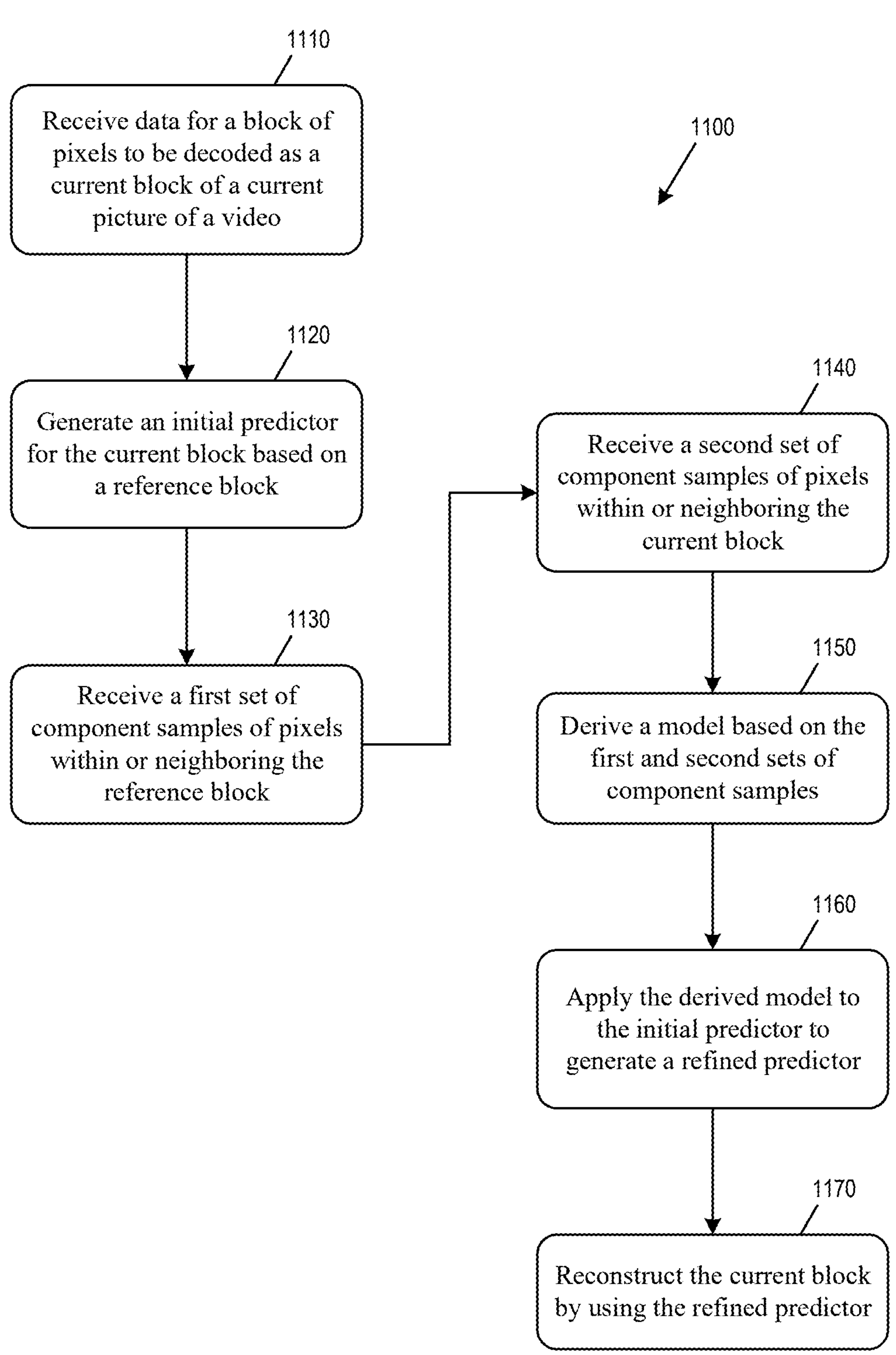
FIG. 11 conceptually illustrates a process that uses a predictor refined by a cross-component model when decoding a block of pixels.

FIG. 11 conceptually illustrates a process 1100 that uses a predictor refined by a cross-component model when decoding a block of pixels. In some embodiments, one or more processing units (e.g., a processor) of a computing device implementing the decoder 900 performs the process 1100 by executing instructions stored in a computer readable medium. In some embodiments, an electronic apparatus implementing the decoder 900 performs the process 1100.

The decoder receives (at block 1110) data to be decoded as a current block of pixels in a current picture of a video.

The decoder generates (at block 1120) an initial predictor for the current block based on a reference block. The reference block may be identified by a motion vector, a block vector, or an intra-prediction mode of the current block.

The decoder receives (at block 1130) a first set of component samples of pixels within or neighboring the reference block. The decoder receives (at block 1140) a second set of component samples of pixels within or neighboring the current block. In some embodiments, the first set of component samples are neighboring samples of the reference block and the second set of component samples are neighboring samples of the current block. In some embodiments, the first set of component samples are luma samples of the reference block and the second set of component samples are luma samples of the current block. In some embodiments, the first set of component samples are chroma samples of the reference block and the second set of component samples are chroma samples of the current block.

The decoder derives (at block 1150) a model based on the first and second sets of component samples. The derived model may be linear or non-linear (e.g., has a non-linear term such as clipping.) The derived model may be a convolution model that includes a M×N filter.

The decoder applies (at block 1160) the derived model to the initial predictor to generate a refined predictor. In some embodiments, the decoder derives multiple candidate models based on the first and second sets of component samples and selects one candidate model from the multiple candidate models. In some embodiments, the decoder receives an indication (e.g., a syntax element) from a bitstream for selecting the candidate model from the multiple candidate models. In some embodiments, the candidate model is selected implicitly based on a setting (e.g., template-matching setting, boundary-matching setting, or model-accuracy setting) for decoding the current block.

The decoder reconstructs (at block 1170) the current block by using the refined predictor. The decoder may then provide the reconstructed current block for display as part of the reconstructed current picture. In some embodiments, the decoder receives an indication from the bitstream for determining whether to use the initial predictor or the refined predictor to decode the current block. In some embodiments, the decoder implicitly determines whether to use the initial predictor or the refined predictor to decode the current block based on a setting (e.g., template-matching setting, boundary-matching setting, or model-accuracy setting) for decoding the current block.

In some embodiments, a weighted sum of the refined predictor and the initial predictor is used as a final predictor for reconstructing the current block. In some embodiments, a first weight assigned to the initial predictor and a second weight assigned to the refined predictor for generating the weighted sum are determined based on one or more prediction modes used to code one or more neighboring blocks of the current block. In some embodiments, the first weight and the second weight are determined based on a first number of neighboring blocks coded in a first prediction mode and a second number of neighboring blocks coded in a second prediction mode. (First and second prediction modes may be any of intra, inter, AMVP, merge mode, etc.)

IV. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
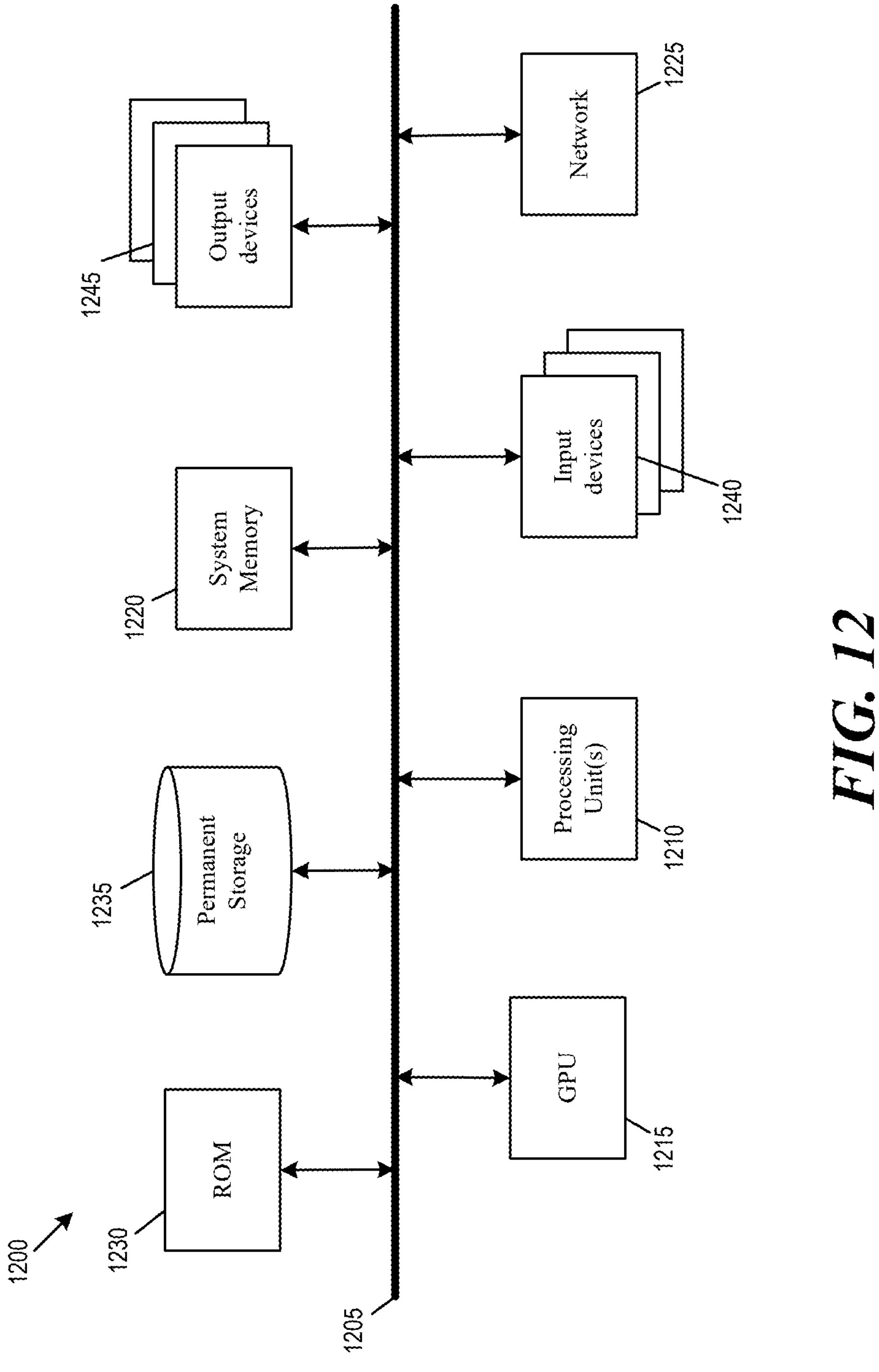
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 8 and FIG. 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

generating an initial predictor for the current block based on a reference block;

receiving a first set of component samples of pixels within or neighboring the reference block;

receiving a second set of component samples of pixels within or neighboring the current block;

deriving a model based on the first and second sets of component samples;

applying the derived model to the initial predictor to generate a refined predictor; and decoding or encoding the current block by using the refined predictor.

2. The video coding method of claim 1, wherein the first set of component samples are neighboring samples of the reference block and the second set of component samples are neighboring samples of the current block.

3. The video coding method of claim 1, wherein the first set of component samples are luma samples of the reference block and the second set of component samples are luma samples of the current block.

4. The video coding method of claim 1, wherein the first set of component samples are neighboring chroma samples of the reference block and the second set of component samples are neighboring chroma samples of the current block.

5. The video coding method of claim 1, wherein the derived model comprises a non-linear term.

6. The video coding method of claim 1, wherein the derived model comprises a M×N filter.

7. The video coding method of claim 1, wherein a weighted sum of the refined predictor and the initial predictor is used as a final predictor for reconstructing the current block.

8. The video coding method of claim 7, wherein a first weight assigned to the initial predictor and a second weight assigned to the refined predictor for generating the weighted sum are determined based on one or more prediction modes used to code one or more neighboring blocks of the current block.

9. The video coding method of claim 8, wherein the first weight and the second weight are determined based on a first number of neighboring blocks coded in a first prediction mode and a second number of neighboring blocks coded in a second prediction mode.

10. The video coding method of claim 1, wherein deriving the model comprises deriving a plurality of candidate models based on the first and second sets of component samples and selecting one candidate model from the plurality of candidate models.

11. The video coding method of claim 10, further comprising receiving an indication from a bitstream or signaling the indication to the bitstream for selecting the candidate model from the plurality of candidate models.

12. The video coding method of claim 10, wherein the candidate model is selected implicitly based on a setting for encoding or decoding the current block.

13. The video coding method of claim 1, further comprising receiving an indication from a bitstream or signaling the indication to the bitstream for determining whether to use the initial predictor or the refined predictor to encode or decode the current block.

14. The video coding method of claim 1, further comprising implicitly determining whether to use the initial predictor or the refined predictor to encode or decode the current block based on a setting for encoding or decoding the current block.

15. An electronic apparatus comprising:

a video coder circuit configured to perform operations comprising:

receiving data for a block of pixels to be encoded or decoded as a current block of a current picture of a video;

generating an initial predictor for the current block based on a reference block;

receiving a first set of component samples of pixels within or neighboring the reference block;

receiving a second set of component samples of pixels within or neighboring the current block;

deriving a model based on the first and second sets of component samples;

applying the derived model to the initial predictor to generate a refined predictor; and decoding or encoding the current block by using the refined predictor.

16. A video coding method comprising:

receiving data for a block of pixels to be encoded or decoded as a current block of a current picture of a video;

generating an initial predictor for the current block based on a reference block;

receiving first and second sets of component samples of pixels within or neighboring the current block or the reference block, wherein at least one of the first and second sets of component samples of pixels is from the reference block;

deriving a model based on the first and second sets of component samples;

applying the derived model based on the initial predictor to generate a refined predictor; and decoding or encoding the current block by using the refined predictor.

17. The video coding method of claim 16, wherein the first set of component samples are luma samples of the reference block and the second set of component samples are chroma samples of the reference block.

* * * * *